(12) United States Patent
Guernsey

(10) Patent No.: US 10,604,345 B2
(45) Date of Patent: Mar. 31, 2020

(54) FLAT-TOP SIDE-DRIVE MODULAR CONVEYOR BELT

(71) Applicant: Laitram, L.L.C., Harahan, LA (US)

(72) Inventor: Kevin W. Guernsey, Destin, FL (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 16/301,473

(22) PCT Filed: Jun. 2, 2017

(86) PCT No.: PCT/US2017/035672
§ 371 (c)(1),
(2) Date: Nov. 14, 2018

(87) PCT Pub. No.: WO2017/218212
PCT Pub. Date: Dec. 21, 2017

(65) Prior Publication Data
US 2019/0291959 A1    Sep. 26, 2019

Related U.S. Application Data

(60) Provisional application No. 62/350,279, filed on Jun. 15, 2016.

(51) Int. Cl.
*B65G 17/08*    (2006.01)
(52) U.S. Cl.
CPC ................... *B65G 17/08* (2013.01)
(58) Field of Classification Search
CPC ....................................... B65G 17/08
USPC .......................................................... 198/853
See application file for complete search history.

(56) References Cited

U.S. PATENT DOCUMENTS

| | | |
|---|---|---|
| 5,020,656 A | 6/1991 | Faulkner |
| 5,706,934 A | 1/1998 | Palmaer et al. |
| 6,401,914 B1* | 6/2002 | Greve .................. B65G 17/066 |
| | | 198/779 |
| 6,571,937 B1* | 6/2003 | Costanzo ............... B65G 13/10 |
| | | 198/370.03 |
| 9,481,523 B2 | 11/2016 | Talsma et al. |
| 2006/0076218 A1 | 4/2006 | Marshall et al. |
| 2009/0194388 A1 | 8/2009 | Cornelissen et al. |

FOREIGN PATENT DOCUMENTS

| | | | |
|---|---|---|---|
| EP | 1594776 B1 | 9/2007 | |
| FR | 3000730 A1 * | 7/2014 | ............. B65G 15/44 |

* cited by examiner

*Primary Examiner* — Gene O Crawford
*Assistant Examiner* — Lester III Rushin
(74) *Attorney, Agent, or Firm* — James T. Cronvich

(57) ABSTRACT

A modular plastic conveyor belt constructed of a series of block-shaped belt modules. The belt has drive elements along its left and right sides for side-driving by a sprocket or drive belt. The top side and the bottom side are flat, devoid of drive structure, and provide high impact resistance and reversibility. Hinge elements along leading and trailing sides have circular hinge-pin holes or elongated oval holes that allow the belt to collapse under low tension.

15 Claims, 4 Drawing Sheets

FLAT-TOP SIDE-DRIVE MODULAR CONVEYOR BELT

BACKGROUND

The invention relates generally to power-driven conveyors and more particularly to articulated modular plastic conveyor belts.

Modular plastic conveyor belts enjoy wide application in the food-handling industry. Modular plastic belts are constructed of a series of rows of plastic belt modules linked together at hinge joints between consecutive rows. Hinge eyes at the leading and trailing ends of each row are interleaved with the hinge eyes of leading and trailing belt rows. A hinge pin extends through a passageway formed by the interleaved hinge eyes to form the hinge joints at which the belt can articulate about drive and idle sprockets. Unlike flat belts, which are pre-tensioned and frictionally driven by pulleys, modular plastic belts are not pre-tensioned and are positively driven by toothed drive sprockets. Modular plastic belts have drive structure, e.g., drive bars and drive pockets, engaged by drive faces or sprocket or drum teeth.

When a modular plastic conveyor belt is used in a food-contact application, for example, grease and other contaminants that build up must be periodically cleaned from the belt. Belts with a lot of nooks and crannies, which are hard to access with a water spray, are difficult to clean. The drive structure in belts, a recessed drive pocket, for example, is difficult to clean.

Modular plastic flat-top conveyor belts are often used on butchering lines. The flat top of the belt provides a cutting surface for butchering operations. The cutting surface is naturally subject to abrading and scoring by bones and butcher knives and cleavers. And the belt must be able to absorb the impacts of knives and cleavers as well as the impacts of heavy carcasses dropped onto the cutting surface. Many modular plastic meat belts have a transverse drive bar between the hinge eyes, and impacts on the cutting surface are transmitted through only the drive bar and the hinge eyes.

SUMMARY

One version of a conveyor belt module embodying features of the invention comprises a module body in the shape of a block having three pairs of opposite sides: (a) a top side and a bottom side spaced apart in a thickness direction; (b) a leading side and a trailing side spaced apart in a length direction; and (c) a left side and a right side spaced apart in a width direction. Leading hinge elements are spaced apart in the width direction across leading spaces along the leading side, and trailing hinge elements are spaced apart in the width direction across trailing spaces along the trailing side. The leading and trailing hinge elements project outward in the length direction from the leading and trailing sides. The leading hinge elements are aligned with the trailing spaces across the module body, and the trailing hinge elements are aligned with the leading spaces across the module body. A left-side drive element has a drive-receiving face on the left side of the module body, and a right-side drive element has a drive-receiving face on the right side.

Another version of a conveyor belt comprises a module body in the shape of a block having three pairs of opposite sides: (a) a continuous flat top side and a continuous flat bottom side spaced apart in a thickness direction; (b) a leading side and a trailing side spaced apart in a length direction; and (c) a left side and a right side spaced apart in a width direction.

Leading hinge elements are spaced apart in the width direction across leading spaces along the leading side, and trailing hinge elements are spaced apart in the width direction across trailing spaces along the trailing side. The leading and trailing hinge elements project outward in the length direction from the leading and trailing sides. The leading hinge elements are aligned with the trailing spaces across the module body, and the trailing hinge elements are aligned with the leading spaces across the module body. A left-side drive element has a drive-receiving face on the left side of the module body.

In another aspect, one version of a conveyor belt embodying features of the invention comprises a series of rows of one or more side-by-side block-shaped belt modules, each row having three pairs of opposite sides: (a) a top side and a bottom side spaced apart in a thickness direction; (b) a leading side and a trailing side spaced apart in a length direction; and (c) a left side and a right side spaced apart in a width direction. Leading hinge elements are spaced apart in the width direction across leading spaces along the leading side, and trailing hinge elements are spaced apart in the width direction across trailing spaces along the trailing side. The leading and trailing hinge elements project outward in the length direction from the leading and trailing sides. The leading hinge elements are aligned with the trailing spaces across the module body, and the trailing hinge elements are aligned with the leading spaces across the module body so that the leading and trailing hinge elements of each row are received in the trailing and leading spaces of the adjacent rows with the hinge elements interleaved to form a belt loop with the top sides of the rows forming an outer loop surface and the bottom sides forming an inner loop surface. At least some of the rows are drive rows including a left-side drive element having a drive-receiving face on the left side and a right-side drive element having a drive-receiving face on the right side.

Another version of a conveyor belt comprises a series of rows of one or more side-by-side block-shaped belt modules, each row having three pairs of opposite sides: (a) a continuous flat top side and a continuous flat bottom side spaced apart in a thickness direction; (b) a leading side and a trailing side spaced apart in a length direction; and (c) a left side and a right side spaced apart in a width direction. Leading hinge elements are spaced apart in the width direction across leading spaces along the leading side, and trailing hinge elements are spaced apart in the width direction across trailing spaces along the trailing side. The leading and trailing hinge elements project outward in the length direction from the leading and trailing sides. The leading hinge elements are aligned with the trailing spaces across the module body, and the trailing hinge elements are aligned with the leading spaces across the module body so that the leading and trailing hinge elements of each row are received in the trailing and leading spaces of the adjacent rows with the hinge elements interleaved to form a belt loop with the top sides of the rows forming an outer loop surface and the bottom sides forming an inner loop surface. At least some of the rows are drive rows including a left-side drive element having a drive-receiving face on the left side.

DETAILED DESCRIPTION

Figure 1:
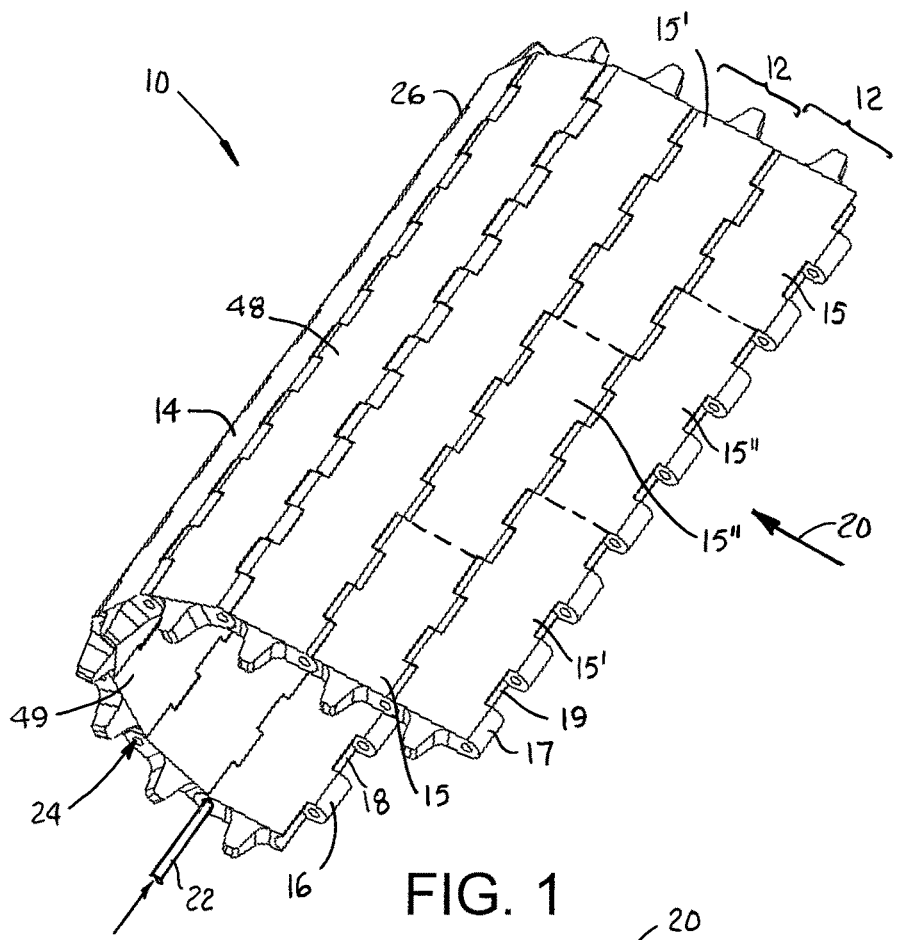
FIG. 1 is an isometric view of a portion of a modular plastic conveyor belt embodying features of the invention.
Figure 2:
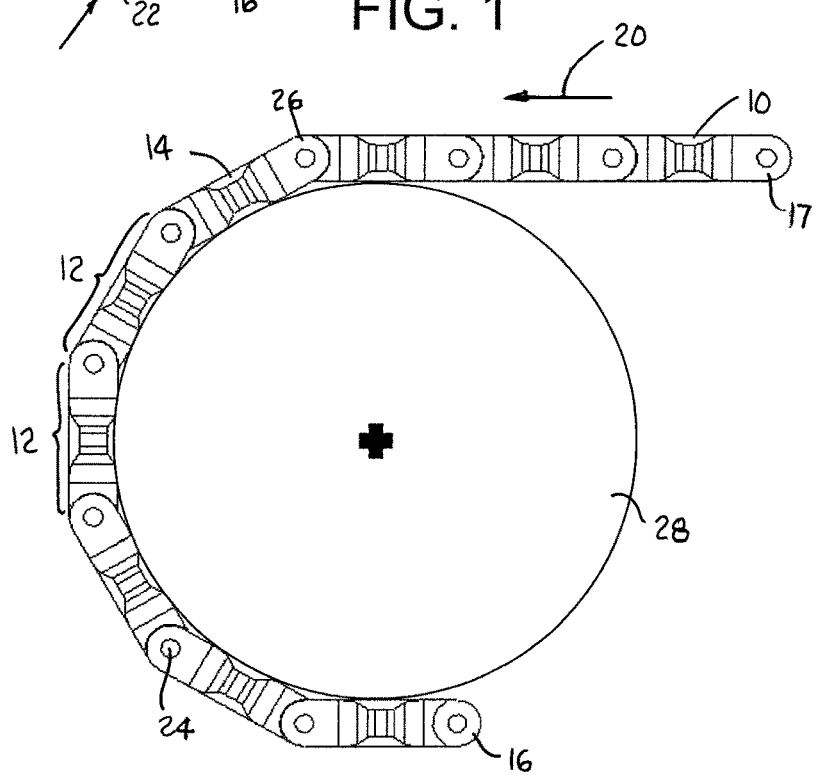
FIG. 2 is a side elevation view of the conveyor belt of FIG. 1 and including a reversing roller.

A modular plastic conveyor belt embodying features of the invention is shown in FIGS. 1 and 2. The belt 10 is constructed of a series of rows 12 of plastic belt modules 14. In this example each row 12 is composed of a single belt module. But each row could alternatively be constructed of more than one belt module, such as three modules 15, 15', and 15" arranged in a bricklay pattern as indicated by the dashed lines designating seams between side-by-side modules. The modules shown are an interior module 15" and two edge modules: a short edge module 15 and a longer edge module 15'. Each row 12, whether formed by one module 14 or multiple modules 15, 15', 15", has a plurality of leading hinge elements 16 extending outward from a leading side 18 and a plurality of trailing hinge elements 17 extending outward from a trailing side 19 for the belt traveling in a direction of belt travel 20. Hinge pins 22 received in the passageways formed by aligned holes 24 in the interleaved hinge elements 16, 17 of consecutive belt rows 12 interconnect the rows 12 together at hinge joints 26 to form an endless belt loop. The belt 10 articulates around a reversing roller 28 on the hinge pins 22 at the hinge joints 26.

Figure 3A:
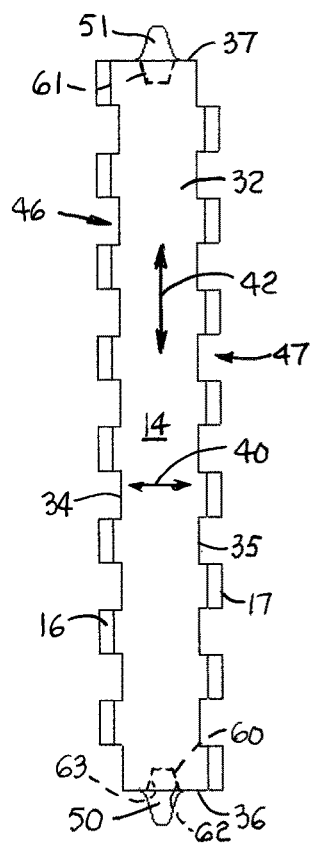
FIGS. 3A-3D are top plan, bottom, front elevation, and enlarged side elevation views of a belt module usable in a conveyor belt as in FIG. 1.
Figure 3B:
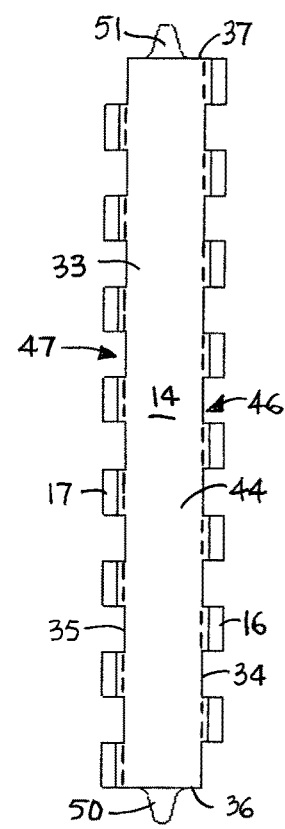
Figure 3C:
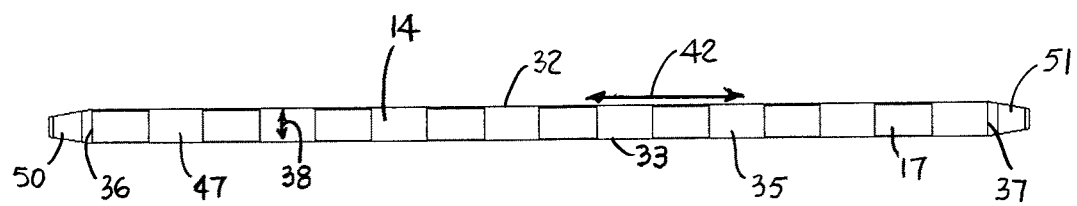

As shown in FIGS. 3A-3D, each belt module 14 has a module body 30 in the shape of a block 44 having three pairs of opposite sides: (a) a top side 32 and a bottom side 33; (b) a leading side 34 and a trailing side 35; and (c) a left side 36 and a right side 37. The top side 32 is spaced apart from the bottom side 33 in a thickness direction 38 of the module 14. The leading side 34 is spaced apart from the trailing side 35 in a length direction 40 of the module 14. (The length direction 40 is parallel to the direction of belt travel of a conveyor belt constructed of modules such as this one.) The left side 36 is spaced apart from the right side in a width direction 42 of the belt module 14. The block 44, as further delineated by the dashed lines in FIG. 3B, is generally shaped like a rectangular cuboid with flat top, bottom, leading, trailing, left, and right rectangular side faces 32, 33, 34, 35, 36, 37. The surface area of the continuous flat top side 32 equals the surface area of the continuous flat bottom side 33 in the version shown in the figures. The continuous flat bottom side 33 provides the module 14 with a broad support surface to distribute impact and shear loads over a larger area and so reduce the maximum pressure and increase the module's wear life. But the sides do not have to be perfectly flat. For example, the top side 32 could be convexly curved, and the leading and trailing sides 34, 35 could be concavely scalloped. And the top and bottom sides 32, 33 don't have to be continuous. Drainage or airflow holes could extend through the thickness of the module from the top side to the bottom side. The leading and trailing hinge elements 16, 17 project outward in the length direction from the leading and trailing sides 34, 35. The hinge elements 16, 17 are spaced apart by leading and trailing spaces 46, 47 between consecutive hinge elements along the width direction 42. The leading hinge elements 16 are aligned with the trailing spaces 47 across the module body 44. The trailing hinge elements 17 are aligned with the leading spaces 46. So the leading and trailing hinge elements 16, 17 are offset from each other in the width direction 42. The spaces 46, 47 are slightly wider than the width of the hinge elements 16, 17 so that the leading hinge elements 16 of the module 14 can be received in the trailing spaces 47 of an adjacent module. In this way the hinge elements 16, 17 of adjacent modules 14 can be interleaved and joined by hinge pins 22 extending through the aligned holes 24 as in FIG. 1. The holes 24 and the hinge axis they define are disposed midway between the top and bottom sides 32, 33 in this version of module, which can be used to construct a belt that can be reversed for even greater wear life. And the hinge elements 16, 17 have top and bottom surfaces 41, 43 continuous with the top and bottom sides 32, 33 of the intermediate module block 44. The resulting belt loop has an outer loop surface 48 formed by the top sides 32 of the linked modules and an inner loop surface 49 formed by the bottom sides 33 of the modules. When the belt is reversed, the resulting belt loop has an outer loop surface 48 formed by the bottom sides 33 of the linked modules and an inner loop surface 49 formed by the top sides 32 of the modules. The continuous outer loop surface eliminates pinch points for fingers.

As shown in FIGS. 3A-3D, the belt module 14 has a left-side drive element 50 protruding outward of the left side 36 of the module in the width direction 42 and a right-side drive element 51 protruding outward of the right side 37. In this example the left- and right-side drive elements 50, 51 are identical. The protruding drive elements 50, 51 can be integrally molded with the belt module 14, or they can be separate, attached pieces. In this version the drive elements 50, 51 are teeth. The thickness of each tooth 50, 51 narrows with distance outward from the left and right sides 36, 37 of the module 14. The teeth 50, 51 are shown in FIG. 3B to be located midway between the leading and trailing ends 34, 35 of the module 14. But they could also be offset in the length direction 40 closer to the leading or trailing side 34, 35. Or the left-side drive element 50 could be located along the left side 36 the same distance from the leading side 34 as the right-side drive element 51 is positioned along the right side 37 from the trailing side 35. Alternatively, the belt module could be made with a drive element on only one side.

Figure 4:
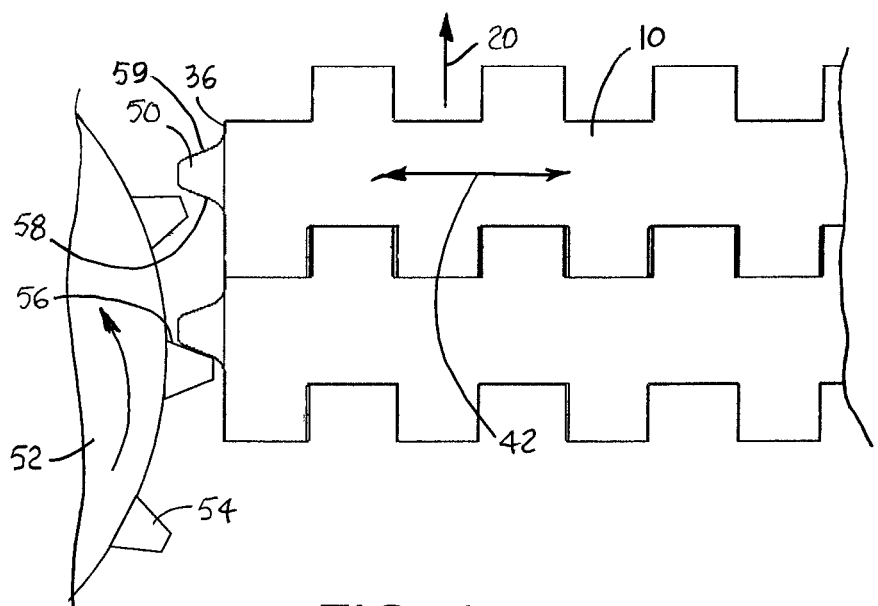
FIG. 4 is a top plan view of a side-edge portion of a conveyor belt as in FIG. 1 driven at the edge by a drive sprocket.

The left side 36 of a portion of a conveyor belt 10 as in FIG. 1 is shown in FIG. 4 being driven by a drive sprocket 52. As an alternative, the belt 10 can be driven at the sides by intermediate drive belts. The left-side drive teeth 50 are engaged by the sprocket's driving teeth 54. A leading face 56 of each sprocket tooth 54 drives against a trailing drive face 58 on each drive element 50 to advance the belt in the direction of belt travel 20. If the belt 10 or its direction of travel 20 is reversed, the sprocket teeth 54 would drive against an opposite drive face 59 of the drive tooth 50. The sprocket 52 has an axis of rotation parallel to the thickness direction of the belt 10, i.e., into the page in FIG. 4. But the sprocket could alternatively be arranged perpendicular to its arrangement in FIG. 4. In that case the sprocket's axis of rotation would be parallel to the width direction 42 of the belt 10. And the drive elements 50 or the sprocket teeth 54 would be shaped differently to account for the different angle and direction of engagement.

FIG. 3A shows alternative female left- and right-side drive elements 60, 61 recessed into the left and right sides 36, 37 of the module 14. Although not as readily cleanable as the protruding teeth 50, 51, the receptacles 60, 61 recessed into the left and right sides 36, 37 are bounded by leading and trailing drive faces 62, 63 capable of receiving a drive force from a drive sprocket. The side drive allow the bottom sides 33 of the belt modules to have continuous uninterrupted flat surfaces devoid of hard-to-clean drive projections or pockets.

Figure 3D:
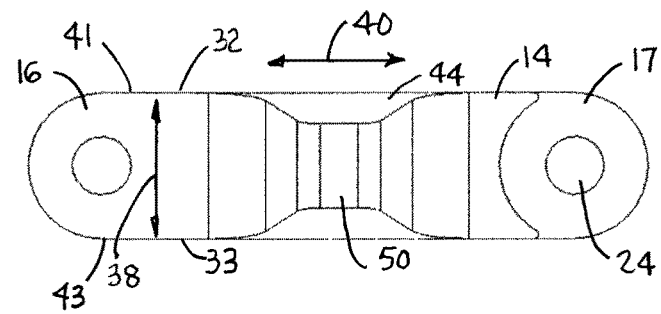
Figure 5:
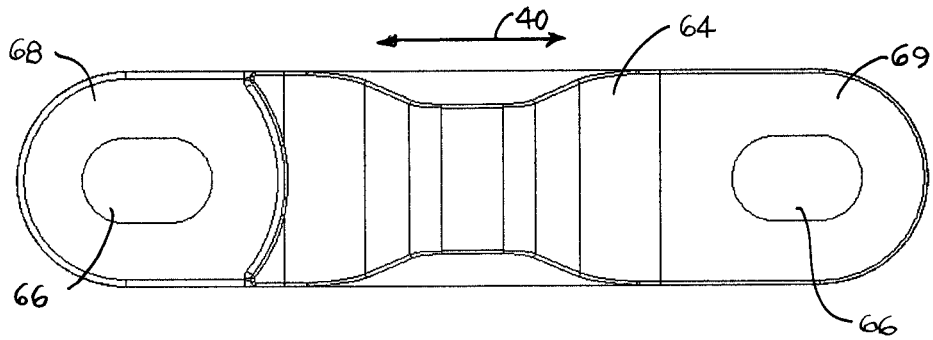
FIG. 5 is an enlarged side elevation view of another version of a belt module as in FIG. 3D with elongated hinge-pin holes.
Figure 6A:
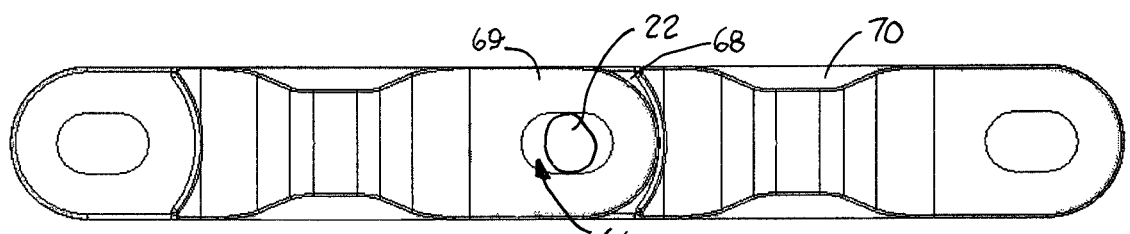
FIG. 6A is a side elevation view of two interconnected belt modules as in FIG. 5 in a collapsed state.
Figure 6B:
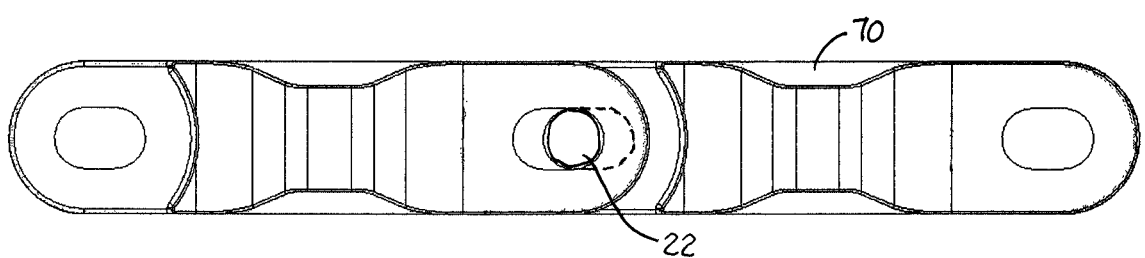
FIG. 6B is a side elevation view as in FIG. 6B with the modules in an expanded, tensioned state.
Figure 7A:
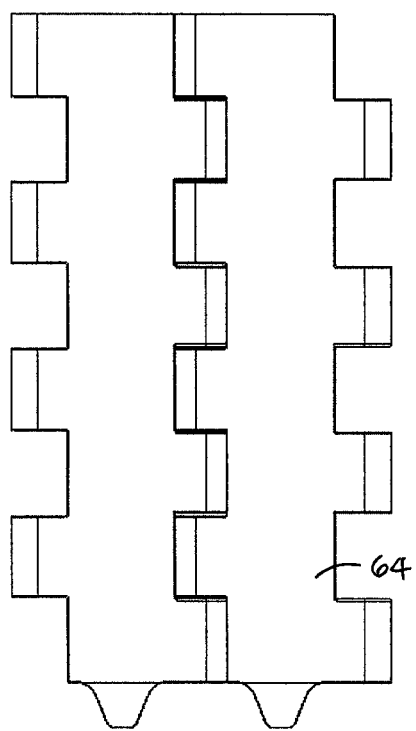
FIGS. 7A and 7B are top plan views of the belt modules corresponding to the states in FIGS. 6A and 6B.
Figure 7B:
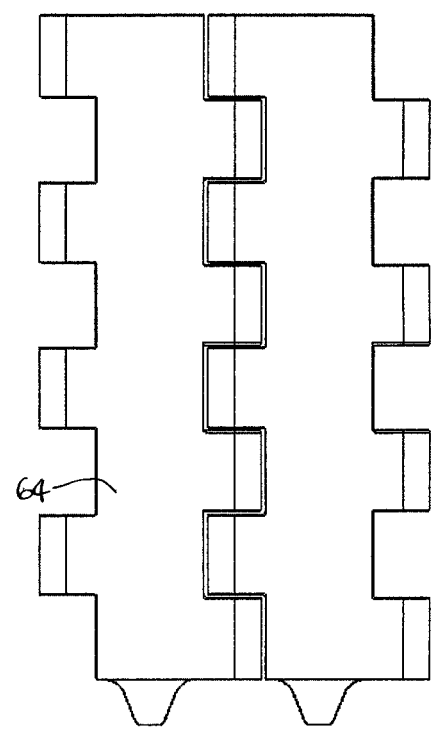

Unlike the belt module 14 of FIG. 3D, which has a hinge hole 24 that is circular, the belt module 64 of FIG. 5 has slotted hinge holes 66 that are elongated in the length direction 40 of the module. The elongated holes 66 through leading and trailing hinge elements 68, 69 provide the circular hinge pin 22 enough clearance so that a belt 70 constructed of the modules 64 can stretch, or lengthen, in the direction of belt travel 20, as shown in FIG. 6B. When not under tension, the belt 70 can collapse in length until the elongated oval hinge-pin holes 66 of the interleaved hinge elements 68, 69 are perfectly aligned. The collapsible modules 64 are especially useful in a side-driven belt like this because they ensure that the tension in the belt is low on exiting the side-drive sprocket and tenting of the belt rows is prevented. The modules 64 are also shown collapsed and uncollapsed from the top side in FIGS. 7A and 7B. Collapsible modules are also useful in straight-running belts driven by intermediate drives because they allow the belt rows to collapse upon exiting the intermediate drives.

Thus, the various versions of the conveyor belts provide one or more benefits, such as (a) no drive geometry on the bottom side; (b) edge-driving; (c) belt reversibility; (d) high impact resistance; (e) symmetric belt modules to ease assembly; (f) bidirectionality; (g) collapsibility under low tension; and (h) no pinch points.

What is claimed is:

1. A conveyor belt module comprising:
    a module body in the shape of a block having three pairs of opposite sides:
        a top side and a bottom side spaced apart in a thickness direction;
        a leading side and a trailing side spaced apart in a length direction; and
        a left side and a right side spaced apart in a width direction, wherein the left side terminates in an outer left-side face and the right side terminates in an outer right-side face;
    leading hinge elements spaced apart in the width direction across leading spaces along the leading side and trailing hinge elements spaced apart in the width direction across trailing spaces along the trailing side, wherein the leading and trailing hinge elements project outward in the length direction from the leading and trailing sides and wherein the leading hinge elements are aligned with the trailing spaces across the module body and the trailing hinge elements are aligned with the leading spaces across the module body;
    a left-side drive element having a drive-receiving face on the outer left-side face of the module body.

2. A conveyor belt module as in claim 1 further comprising a right-side drive element having a drive-receiving face on the outer right-side face of the module body.

3. A conveyor belt module as in claim 2 wherein the left-side drive element is positioned along the outer left-side face the same distance from the leading side as the right-hand drive element is positioned along the outer right-side face from the trailing side.

4. A conveyor belt module as in claim 2 wherein the left-side and right-side drive elements are receptacles recessed into the left- and right-side faces of the module body.

5. A conveyor belt module as in claim 1 wherein the bottom side of the block is rectangular and provides a large surface area to distribute loads and reduce the pressure on the bottom side.

6. A conveyor belt module as in claim 1 wherein the leading and trailing hinge elements each have a through hole opening onto the spaces bordering the hinge element and wherein the holes are elongated in the length direction.

7. A conveyor belt module as in claim 1 wherein the leading and trailing hinge elements each have a through hole disposed midway between the top side and the bottom side.

8. A conveyor belt module as in claim 1 wherein the bottom side and the top side have equal surface areas.

9. A conveyor belt comprising:
    a series of rows of one or more side-by-side block-shaped belt modules, each row having three pairs of opposite sides:
        a top side and a bottom side spaced apart in a thickness direction;
        a leading side and a trailing side spaced apart in a length direction; and
        a left side and a right side spaced apart in a width direction, wherein the left side terminates in an outer left-side face and the right side terminates in an outer right-side face;
    leading hinge elements spaced apart in the width direction across leading spaces along the leading side and trailing hinge elements spaced apart in the width direction across trailing spaces along the trailing side, wherein the leading and trailing hinge elements project outward in the length direction from the leading and trailing sides and wherein the leading hinge elements are aligned with the trailing spaces across the module body and the trailing hinge elements are aligned with the leading spaces across the module body so that the leading and trailing hinge elements of each row are received in the trailing and leading spaces of the adjacent rows with the hinge elements interleaved to form a belt loop with the top sides of the rows forming an outer loop surface and the bottom sides forming an inner loop surface;
    wherein at least some of the rows are drive rows including a left-side drive element having a drive-receiving face on the outer left-side face.

10. A conveyor belt as in claim 9 wherein the drive rows further include a right-side drive element having a drive-receiving face on the outer right-side face.

11. A conveyor belt as in claim 10 wherein the left-side drive element is positioned along the outer left-side face of each drive row the same distance from the leading side as the right-hand drive element is positioned along the outer right-side face from the trailing side.

12. A conveyor belt as in claim 9 comprising a plurality of hinge pins and wherein the leading and trailing hinge elements each have a through hole opening onto the spaces bordering the hinge element and wherein the through holes of the interleaved hinge elements of adjacent rows are aligned to form passageways extending in the width direction for receiving the hinge pins and wherein the holes are elongated in the length direction relative to the diameter of the hinge pins to allow adjacent rows under no tension to collapse in the length direction.

13. A conveyor belt as in claim 9 wherein the conveyor belt is reversible wherein the bottom sides of the rows form the outer belt loop and the top sides form the inner belt loop.

14. A conveyor belt as in claim 9 wherein the bottom side is rectangular and provides a large surface area to distribute loads and reduce the pressure on the bottom side.

15. A conveyor belt module as in claim 1 wherein the bottom side is a continuous flat surface.

* * * * *